(12) United States Patent
Gan et al.

(10) Patent No.: US 10,965,793 B2
(45) Date of Patent: Mar. 30, 2021

(54) METHODS AND NODES FOR FACILITATING A PDU SESSION PROCEDURE IN INTERWORKING NETWORKS

(71) Applicant: Telefonaktiebolaget LM Ericsson (publ), Stockholm (SE)

(72) Inventors: Juying Gan, Shanghai (CN); Yunjie Lu, Shanghai (CN); Gang Ren, Shanghai (CN); Wu Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/643,507

(22) PCT Filed: Aug. 9, 2019

(86) PCT No.: PCT/CN2019/099965
§ 371 (c)(1),
(2) Date: Feb. 28, 2020

(87) PCT Pub. No.: WO2020/030102
PCT Pub. Date: Feb. 13, 2020

(65) Prior Publication Data
US 2020/0195762 A1 Jun. 18, 2020

(30) Foreign Application Priority Data

Aug. 10, 2018 (WO) ................ PCT/CN2018/100010

(51) Int. Cl.
*H04L 29/08* (2006.01)
*H04W 76/11* (2018.01)
(Continued)

(52) U.S. Cl.
CPC ............ *H04L 69/322* (2013.01); *H04L 67/14* (2013.01); *H04L 69/08* (2013.01); *H04W 8/08* (2013.01);
(Continued)

(58) Field of Classification Search
CPC ....... H04L 69/322; H04L 67/14; H04L 69/08; H04W 76/11; H04W 8/08;
(Continued)

(56) References Cited

U.S. PATENT DOCUMENTS 10,524,166 B2 * 12/2019 Youn ..................... H04W 36/14
2017/0339609 A1 11/2017 Youn et al.
(Continued)

FOREIGN PATENT DOCUMENTS

WO 2018085187 A1 5/2018
WO 2018129437 A1 7/2018

OTHER PUBLICATIONS

Nokia, Alcatel-Lucent Shanghai Bell, Intel, "Interworking with EPS", 3GPP TSG-CT WG1 Meeting #105, 3GPP TR 24.890 V0.2.1, Aug. 21-25, 2017, 12 pages.
(Continued)

Primary Examiner — Will W Lin
(74) Attorney, Agent, or Firm — NDWE LLP

(57) ABSTRACT

A method at a first node for facilitating a PDU session procedure for a UE in a first communication network, wherein the first communication network is interworking with a second communication network, and a second node supporting the interworking is selected for managing the PDU session, the method comprising: determining an indication which indicates whether the PDU session supports interworking with the second network; and sending the indication to the second node. According to various aspects
(Continued)

```
200
┌─────────────────────────────────────┐
│ 201 determining an indication which │
│ indicates whether the PDU session   │
│ supports interworking with the second│
│ network                             │
└─────────────────────────────────────┘
                  │
                  ▼
┌─────────────────────────────────────┐
│ 202 sending the indication to the second│
│ node                                │
└─────────────────────────────────────┘
``` and embodiments of the method, allocation of resources can be improved and the deployment can be simplified.

23 Claims, 5 Drawing Sheets

(51) Int. Cl.
*H04L 29/06* (2006.01)
*H04W 8/08* (2009.01)
*H04W 36/00* (2009.01)
*H04W 36/14* (2009.01)

(52) U.S. Cl.
CPC ....... *H04W 36/0033* (2013.01); *H04W 36/14* (2013.01); *H04W 76/11* (2018.02)

(58) Field of Classification Search
CPC ............. H04W 36/0033; H04W 36/14; H04W 36/0022; H04W 8/12; H04W 8/065; H04W 76/10; H04W 36/00
See application file for complete search history.

(56) References Cited

U.S. PATENT DOCUMENTS

| | | | | |
|---|---|---|---|---|
| 2018/0352483 | A1* | 12/2018 | Youn | H04W 76/18 |
| 2018/0376384 | A1* | 12/2018 | Youn | H04W 8/02 |
| 2019/0150219 | A1* | 5/2019 | Wang | H04W 76/30 370/329 |
| 2019/0306251 | A1* | 10/2019 | Talebi Fard | H04L 67/14 |
| 2019/0335392 | A1* | 10/2019 | Qiao | H04W 8/08 |
| 2019/0394683 | A1* | 12/2019 | Sillanpaa | H04W 36/0079 |
| 2020/0015128 | A1* | 1/2020 | Stojanovski | H04W 36/0022 |
| 2020/0037386 | A1* | 1/2020 | Park | H04L 29/06 |
| 2020/0077315 | A1* | 3/2020 | Jin | H04W 36/0022 |
| 2020/0100147 | A1* | 3/2020 | Youn | H04W 36/0058 |
| 2020/0120751 | A1* | 4/2020 | Sugawara | H04W 60/00 |
| 2020/0146077 | A1* | 5/2020 | Li | H04W 76/10 |
| 2020/0187043 | A1* | 6/2020 | Xin | H04M 15/66 |
| 2020/0196382 | A1* | 6/2020 | Kawasaki | H04L 69/322 |
| 2020/0229059 | A1* | 7/2020 | Xu | H04W 36/0044 |

OTHER PUBLICATIONS

Office Action, KR App. No. 10-2020-7007355, dated Mar. 26, 2020, 7 pages (English Summary).
International Search Report and Written Opinion for International Application No. PCT/CN2019/099965, dated Oct. 29, 2019, 10 pages.
3GPP TSG-SA WG2 Meeting #128, "Multiple PDU session per DNN," Jul. 2-6, 2018, 17 pages, S2-187307, Vilnius, Lithuania.
3GPP TSG-SA WG2 Meeting #131, "Alignment with stage 3 for EPS interworking indications," Feb. 25-Mar. 1, 2019, 12 pages, S2-1901495, Santa Cruz-Tenerife, Spain.
"5G; System Architecture for the 5G System (3GPP TS 23.501 version 15.2.0 Release 15)," Jun. 2018, 219 pages, ETSI TS 123 501 V15.2.0.
"3rd Generation Partnership Project; Technical Specification Group Services and System Aspects; Procedures for the 5G System; Stage 2 (Release 15)," Jun. 2018, 308 pages, 3GPP TS 23.502 V15.2.0, 3GPP Organizational Partners.
"3rd Generation Partnership Project; Technical Specification Group Core Network and Terminals; 5G System; Unified Data Management Services, Stage 3 (Release 15)," Jun. 2018, 127 pages, 3GPP TS 29.503 V15.0.0, 3GPP Organizational Partners.
Office Action, KR App. No. 10-2020-7007355, dated Sep. 2, 2020, 5 pages (2 pages of English Translation and 3 pages of Original Document).
Grant, KR App. No. 10-2020-7007355, dated Oct. 12, 2020, 4 pages (2 pages of English Translation and 2 pages of Original Document).

* cited by examiner

METHODS AND NODES FOR FACILITATING A PDU SESSION PROCEDURE IN INTERWORKING NETWORKS

CROSS-REFERENCE TO RELATED APPLICATIONS

This application is a National stage of International Application No. PCT/CN2019/099965, filed Aug. 9, 2019, which claims priority to International Application No. PCT/CN2018/100010, filed Aug. 10, 2018, which are hereby incorporated by reference.

TECHNICAL FIELD

The non-limiting and example embodiments of the present disclosure generally relate to the technical field of communication network, and specifically to methods and nodes for facilitating a Protocol Data Unit (PDU) session procedure for a User Equipment (UE) in a first communication network, wherein the first communication network is interworking with a second communication network.

BACKGROUND

This section introduces aspects that may facilitate a better understanding of the disclosure. Accordingly, the statements of this section are to be read in this light and are not to be understood as admissions about what is in the prior art or what is not in the prior art.

Today, there are many kinds of communication networks to meet the demands of communication of people and/or devices. In some cases, two or more different networks will coexist with and interwork with each other, cooperating to provide a bigger coverage for the communication. For example, due to the gradual evolvement of the communication system, it can be envisaged that in some cases, a next generation communication network, e.g., a 5th Generation System (5GS) network, will coexist with and interwork with a current generation communication network, e.g., an Evolved Packet System (EPS) network.

FIG. 1 illustrates the non-roaming architecture for interworking between 5GS and EPC (Evolved Packet Core, the core network of an EPS network)/E-UTRAN (Evolved UMTS Terrestrial Radio Access Network). In the figure, the nodes PCF+PCRF (Policy Control Function+Policy and Charging Rule Function), PGW-C+SMF (Packet Data Network Gateway Control plane function+Session Management Function) and UPF+PGW-U (User Plane Function+Packet Data Network Gateway User plane function) are supporting interworking between 5GS and EPC, which are optional. UEs that are not subject to 5GS and EPC interworking may be served by entities not supporting interworking, i.e. either by PGW/PCRF or SMF/UPF/PCF. Also, in the roaming architecture (not illustrated) for interworking between 5GS and EPC/E-UTRAN, the nodes PCF+PCRF, PGW-C+SMF and UPF+PGW-U supporting the interworking may also exist.

Interworking between different networks makes it possible that the UEs in a network can connect to another network. However, it can also be envisaged that due to some reasons, such as network capability and/or network restriction of a UE, e.g., lack of related hardware and/or software support, lack of money in the related account and so on, the UE in a first network may not connect to a second network which the first network is interworking with.

For example, in a 5GS network, the core network capability of a UE is indicated in a MM (Mobility Management) Core Network Capability information element (IE). The Core Network Capability information element (IE) may have e.g. two values, one value may be "N1 mode supported", indicating a mode of the UE accessing the 5G core network is supported, the other value may be "S1 mode supported", indicating a mode of the UE accessing the EPC core network is supported. In order to ensure that the UE MM Core Network Capability information stored in the AMF (Access and Mobility Management Function) is up to date (e.g. to handle the situation when the USIM (Universal Subscriber Identity Module) is moved into a different device while out of coverage, and the old device did not send the Detach message; and the cases of inter-RAT Registration Area Update), the UE shall send the UE MM Core Network Capability information to the AMF during the Initial Registration and Mobility Registration Update procedure within the NAS (Non-Access Stratum) message. The AMF shall store always the latest UE MM Core Network Capability received from the UE. Any UE MM Core Network Capability that an AMF receives from an old AMF/MME is replaced when the UE provides the UE MM Core Network Capability with Registration signalling. If the UE's MM Core Network Capability information changes (in either CM-CONNECTED or in CM-IDLE state), the UE shall perform a Registration Update ('type' different to 'periodic') when it next returns to NG-RAN (Next Generation Radio Access Network) coverage.

Also, a UE in a 5GS network will be subject to some mobility restrictions. Mobility Restrictions restrict mobility handling or service access of a UE. The Mobility Restriction functionality is provided by the UE (only for mobility restriction categories provided to the UE), the radio access network and the core network. In CM-CONNECTED state, the core network provides mobility restrictions to the radio access network within Handover Restriction List (HRL). Mobility restrictions consists of RAT restriction, Forbidden Area, Service Area Restrictions and Core Network type restriction, wherein the Core Network type restriction defines whether UE is not allowed to connect to a core network. For example, the Core Network type restriction parameter in a 5GS network may have e.g. two values: one value may be "5GC", indicating the UE is not allowed to connect to the core network of a 5GS network, the other value may be "EPC", indicating the UE is not allowed to connect to the core network of a EPS network. The Core Network type restriction parameter of a UE may be found in subscription data of the UE. If subscription data of the UE does not include a Core Network type restriction parameter, then the UE may be allowed to connect to e.g. both the core network of a 5GS network and the core network of an EPS network.

SUMMARY

The abovementioned network capability and/or network restriction of a UE may cause the UE in a first network will not connect to a second network, although the two networks are interworking with each other. This fact may cause a problem for a PDU session procedure for the UE.

The inventors of the present disclosure find, in the current mechanisms for a PDU session procedure for a UE in a first communication network interworking with a second communication network, the following problem exists: if a node supporting the interworking is selected to manage the PDU session, the node will blindly allocate resources for the PDU session regardless of whether the PDU session supports interworking with the second network. For example, the node supporting the interworking and selected for managing the PDU session will allocate resources for the PDU session in the second communication network, in despite of the PDU session not supporting interworking with the second network, e.g., due to lack of capability to connect to the second communication network and/or due to restriction to connect to the second communication network.

The above problem occurs when a node supporting the interworking is selected for managing the PDU session which does not support interworking with the second network. As an example, for a 5GS network, the interworking with EPS is specified in Rel-15 and the SMF should have the PGW-C capability from the very beginning. It's very likely that all the SMFs deployed in the network have the PGW-C capability, i.e., all the deployed SMFs are PGW-C+SMFs. In this case, no standalone SMF can be selected to manage a PDU session. Even if there are both standalone SMFs and combined PGW-C+SMFs in the deployment, a Network Repository Function (NRF), which may help the AMF to select a SMF to manage a PDU session, may make the selection without considering whether the PDU session supports interworking with the second network, because the NRF doesn't differentiate a standalone SMF and a combined PGW-C+SMF due to some reason (e.g., due to simple configuration of the NRF). In this case, a PGW-C+SMF may be selected to manage a PDU session.

One of the objects of the present disclosure is to resolve or alleviate the above problem.

According to a first aspect of the present disclosure, the object is achieved by a method at a first node for facilitating a PDU session procedure for a UE in a first communication network, wherein the first communication network is interworking with a second communication network, and a second node supporting the interworking is selected for managing the PDU session, the method comprising: determining an indication which indicates whether the PDU session supports interworking with the second communication network; and sending the indication to the second node.

According to a second aspect of the present disclosure, the object is achieved by a first node for facilitating a PDU session procedure for a UE in a first communication network, wherein the first communication network is interworking with a second communication network, and a second node supporting the interworking is selected for managing the PDU session, the first node comprising: determining unit, determining an indication which indicates whether the PDU session supports interworking with the second communication network; and sending unit, sending the indication to the second node.

According to a third aspect of the present disclosure, the object is achieved by a first node for facilitating a PDU session procedure for a UE in a first communication network, wherein the first communication network is interworking with a second communication network, and a second node supporting the interworking is selected for managing the PDU session, the first node comprising: a processor; and a memory, having stored instructions that when executed by the processor cause the first node to determine an indication which indicates whether the PDU session supports interworking with the second communication network, and send the indication to the second node.

According to a fourth aspect of the present disclosure, the object is achieved by a machine readable medium having stored thereon instructions that when executed on a first node cause the first node to perform the method according to the first aspect.

According to a fifth aspect of the present disclosure, the object is achieved by a method at a second node for facilitating a PDU session procedure for a UE in a first communication network, wherein the first communication network is interworking with a second communication network, and the second node is supporting the interworking and is selected for managing the PDU session, the method comprising: receiving an indication indicating whether the PDU session supports interworking with second communication network from a first node; and determining whether the PDU session supports interworking with the second communication network according to the indication.

According to a sixth aspect of the present disclosure, the object is achieved by a second node for facilitating a PDU session procedure for a UE in a first communication network, wherein the first communication network is interworking with a second communication network, and the second node is supporting the interworking and is selected for managing the PDU session, the second node comprising: receiving unit, receiving an indication indicating whether the PDU session supports interworking with second communication network from a first node; and determining unit, determining whether the PDU session supports interworking with the second communication network according to the indication.

According to a seventh aspect of the present disclosure, the object is achieved by a second node for facilitating a PDU session procedure for a UE in a first communication network, wherein the first communication network is interworking with a second communication network, and the second node is supporting the interworking and is selected for managing the PDU session, the second node comprising: a processor; and a memory, having stored instructions that when executed by the processor cause the second node to receive an indication indicating whether the PDU session supports interworking with second communication network from a first node; and determine whether the PDU session supports interworking with the second communication network according to the indication.

According to an eighth aspect of the present disclosure, the object is achieved by a machine readable medium having stored thereon instructions that when executed on a second node cause the second node to perform the method according to the fifth aspect.

The solutions of the present disclosure have at least one of the following advantages:
  improving allocation of resources for the PDU session procedure for a UE in a communication network interworking with another communication network, by considering whether the PDU session supports interworking with second communication network;
  increasing the resource utilization efficiency by means of avoiding allocation of resources which are unnecessary for the PDU session according to the indication and avoiding sending them over NAS;
  keeping the configuration in the NRF simple as well as simplifying the deployment.

BRIEF DESCRIPTION OF THE DRAWINGS

The above and other aspects, features, and benefits of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Embodiments herein will be described more fully hereinafter with reference to the accompanying drawings. The embodiments herein may, however, be embodied in many different forms and should not be construed as limiting the scope of the appended claims.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., herein to modify an element does not by itself connote any priority, precedence, or order of one element over another or the temporal order in which acts of a method are performed, but are used merely as labels to distinguish one element having a certain name from another element having a same name (but for use of the ordinal term) to distinguish the elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Figure 1:
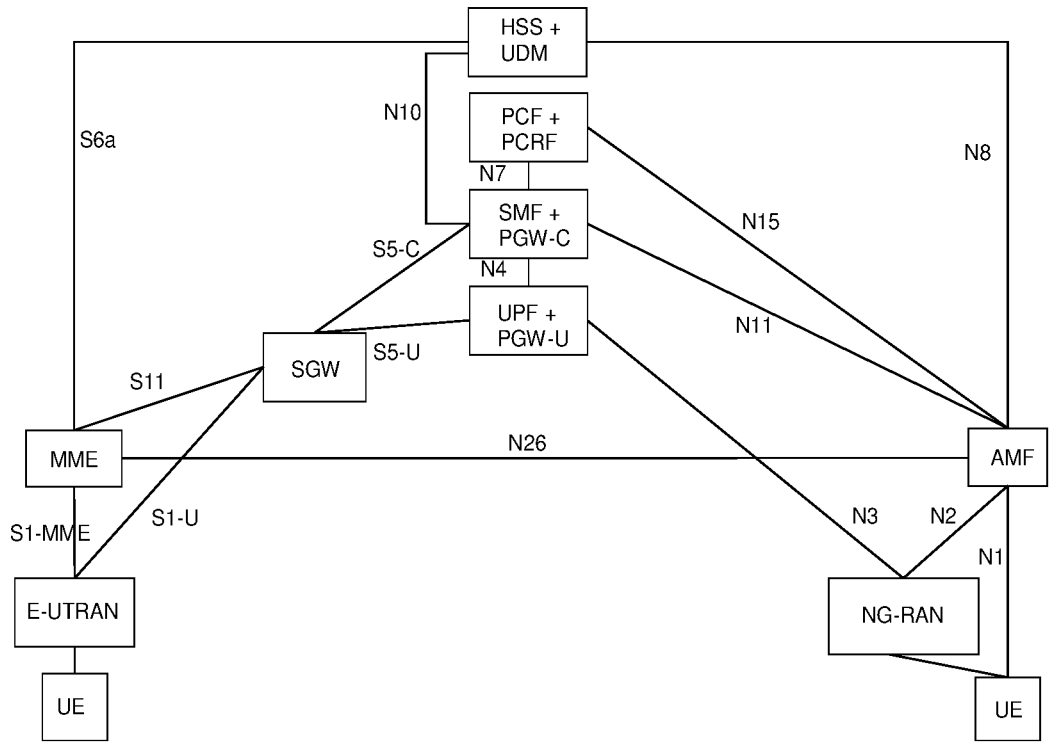
FIG. 1 illustrates the non-roaming architecture for interworking between 5GS and EPC/E-UTRAN.
Figure 2:
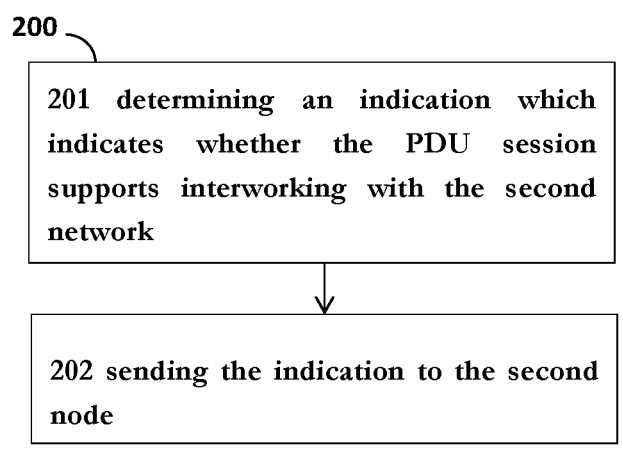
FIG. 2 illustrates flowchart of the method at a first node according to the present disclosure.

A flowchart of a method 200 at a first node for facilitating a PDU session procedure for a UE in a first communication network is shown in FIG. 2, wherein the first communication network is interworking with a second communication network, and a second node supporting the interworking is selected for managing the PDU session, the method comprising the following steps: step 201 of determining an indication which indicates whether the PDU session supports interworking with the second communication network; and step 202 of sending the indication to the second node.

Figure 3:
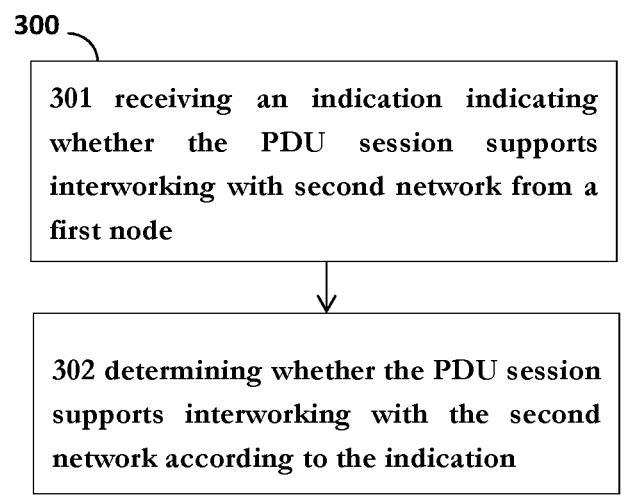
FIG. 3 illustrates flowchart of the method at a second node according to the present dis closure.

A flowchart of a method 300 at a second node for facilitating a PDU session procedure for a UE in a first communication network is shown in FIG. 3, wherein the first communication network is interworking with a second communication network, and the second node is supporting the interworking and is selected for managing the PDU session, the method comprising: step 301 of receiving an indication indicating whether the PDU session supports interworking with second communication network from a first node; and step 302 of determining whether the PDU session supports interworking with the second communication network according to the indication.

Both the first node and the second node can be implemented as a network element on a dedicated hardware, as a software instance or a firmware running on a hardware, as a virtualized function instantiated on an appropriate platform (e.g. on a cloud infrastructure), or as any combination thereof.

Now, further embodiments will be described in connection with an example UE requested PDU session establishment in a 5GS network which is interworking with an EPS network. It can be understood that, although the further embodiments herein are described in the context of the 5GS and EPS networks, the embodiments can be also applied to other PDU session procedures in other different telecommunication networks interworking with each other, if the same problem exists in their mechanisms for the PDU session procedures. It will be also understood that, although specific terms are used in the embodiments, the embodiments are not limited to those specific terms but may be applied to all similar entities. For example, the "user equipment"/"UE" herein may refer to e.g. user terminal, station, terminal, terminal node, and so on.

A UE requested PDU session establishment is a common PDU session procedure for a UE. The procedure is used to establish a new PDU Session, handover a PDN Connection in EPS to PDU Session in 5GS without N26 interface, switch an existing PDU Session between non-3GPP access and 3GPP access, or request a PDU Session for Emergency services.

Figure 4:
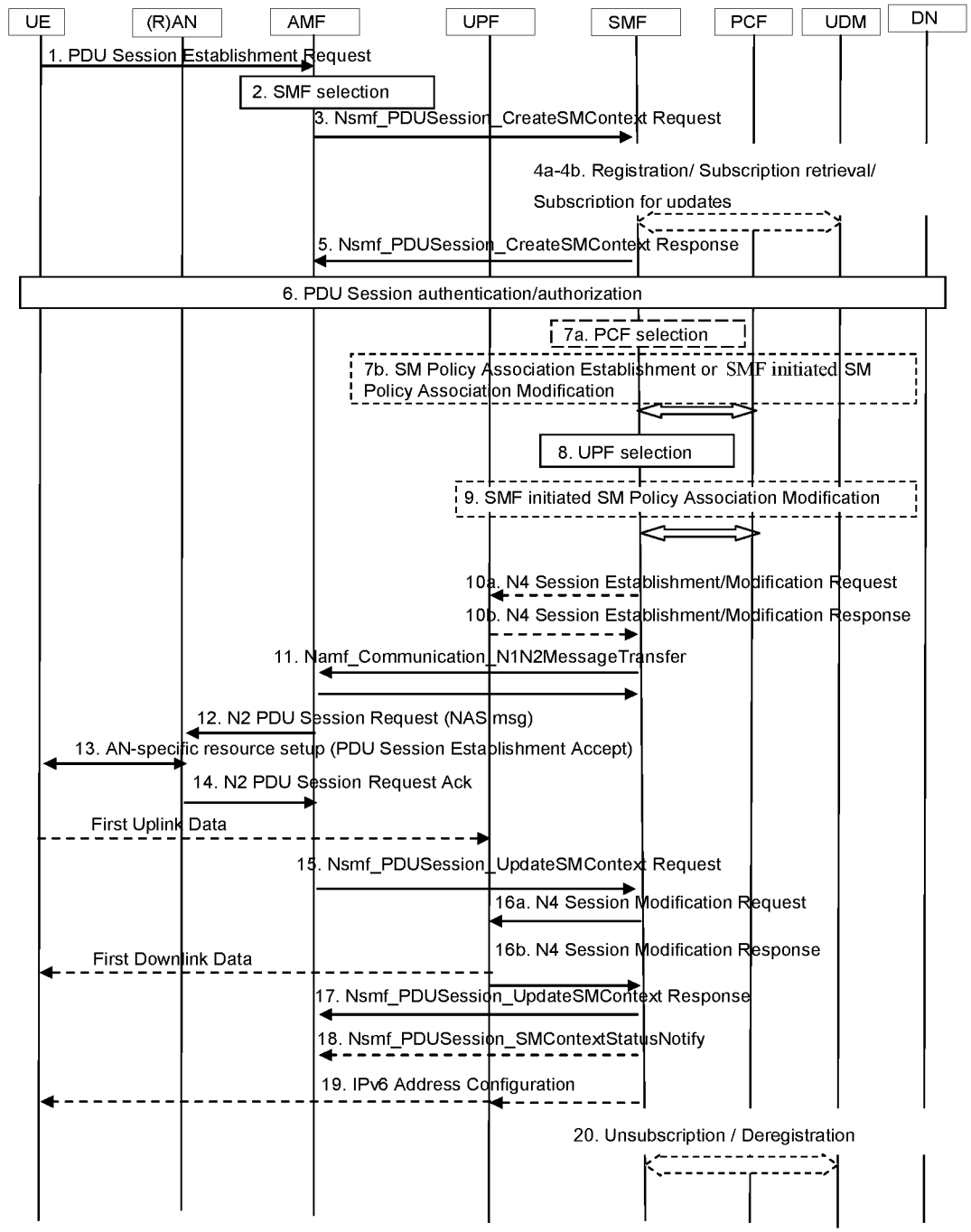
FIG. 4 illustrates a UE requested PDU Session Establishment for non-roaming and roaming with local breakout cases.

FIG. 4 illustrates a UE requested PDU Session Establishment for non-roaming and roaming with local breakout cases. At step 1 in FIG. 4, the UE initiates the UE Requested PDU Session Establishment procedure by the transmission of a NAS message containing a PDU Session Establishment Request. The PDU Session Establishment Request includes necessary information such as a PDU session ID, Requested Type, a Requested SSC mode, and so on. At step 2 in FIG. 4, the AMF may utilize the NRF to discover the SMF instance(s) unless SMF information is available by other means, e.g. locally configured on AMF. The NRF provides the IP address or the FQDN (Fully Qualified Domain Name) of SMF instance(s) or Endpoint Address(es) of SMF service instance(s) to the AMF. The SMF selection function in the AMF selects an SMF instance based on the available SMF instances obtained from NRF or on the configured SMF information in the AMF. At step 3 in FIG. 4, the AMF sends to the SMF either a Nsmf_PDUSession_CreateSMContext Request or a Nsmf_PDUSession_UpdateSMContext Request. If the AMF does not have an association with an SMF for the PDU Session ID provided by the UE (e.g. when Request Type indicates "initial request"), the AMF invokes the Nsmf_PDUSession_CreateSMContext Request, but if the AMF already has an association with the SMF for the PDU Session ID provided by the UE (e.g. when Request Type indicates "existing PDU Session"), the AMF invokes the Nsmf_PDUSession_UpdateSMContext Request. After step 9 and before step 12 in FIG. 4, if the selected SMF is a PGW-C+SMF and the PGW-C+SMF determines that EPS bearer ID(s) needs to be assigned to the QoS flow(s) in the PDU Session, the PGW-C+SMF invokes a Namf_Communication_EBIAssignment Request including PDU Session ID and ARP list to the AMF (not illustrated in FIG. 4). The ARP list indicates the number of the requested EBIs, and the corresponding ARP. The AMF uses the ARP list (including ARP priority level, the pre-emption capability and the pre-emption vulnerability) and the Single Network Slice Selection Assistance Information (S-NSSAI) to prioritize the EBI request, the AMF can revoke the EBI from an ongoing lower priority PDU Session, if the maximum number of EBIs have been reached and a session with a higher priority requests an EBI. The AMF responds the PGW-C+SMF with a cause which indicates whether the assignment is successful or not in a Namf_Communication_EBIAssignment response. If the assignment is successful, the AMF provides a list of <ARP, EBI> pair to the consumer NF. Steps similar to the abovementioned steps also occur in a UE-requested PDU Session Establishment for home-routed roaming scenarios (not illustrated).

The AMF and the selected PGW-C+SMF in the above procedure can act as the first node and the second node of the present disclosure respectively. The AMF can determine an indication which indicates whether the PDU session supports interworking with the EPS network, which may mean whether the allocation of resources for the PDU session is needed, e.g., indicates whether the PDU session can be moved to the EPS network, and send the indication to the PGW-C+SMF to let it allocate the resources or not. Particularly, if determining the PDU session does not support interworking with the EPC network, the AMF determines no resources of the EPS network for the PDU session (e.g., the resources are resources for a bearer in the EPC network in an embodiment) should be allocated; otherwise, the AMF determines resources of the EPS network for the PDU session may be allocated. Then, the AMF may send the indication to the PGW-C+SMF. The PGW-C+SMF may determine whether the PDU session supports interworking with the EPS network according to the indication, e.g., in order to allocate resources for the PDU session accordingly.

In an embodiment, when determining the PDU session does not support interworking with the second network, the AMF may send to the PGW-C+SMF the indication indicating that the PDU session does not support interworking with the EPS network, e.g., in Nsmf_PDUSession_CreateSMContext Request. When the PGW-C+SMF receives such an indication, the PGW-C+SMF should skip preparation for allocating the resources for the PDU session in the EPC network to avoid waste of the resources and improve efficiency of the allocation. However, if the PGW-C+SMF has not been upgraded to realize the indication, the PGW-C+SMF having received the indication may still send a request related to allocating the resources to the AMF, e.g., a Namf_Communication_EBIAssignment Request to request the AMF to allocate an ID of a bearer in the EPS network. In this case, the AMF can reject the request from the PGW-C+SMF, e.g., by returning a new failure cause ("EPS interworking not supported" or something similar) in a response, e.g., in the Namf_Communication_EBIAssignment response. Then, the PGW-C+SMF will skip the preparation work for allocation of the resources, e.g. mapping to EPS bearer is not performed. In another embodiment, the AMF may just reject the request from the PGW-C+SMF, without beforehand sending to the PGW-C+SMF an indication that the UE will not connect to the EPC network.

In an embodiment, when determining the PDU session supports interworking with the second network, the AMF may send to the PGW-C+SMF the indication indicating that the PDU session supports interworking with the EPS network, e.g., in Nsmf_PDUSession_CreateSMContext Request. In an embodiment, when the PDU session supports interworking with the EPS network, the indication from the AMF further indicates whether a N26 interface between the 5GS network and the EPS network is to be used for the interworking of the PDU session. When the PGW-C+SMF receives such an indication, the PGW-C+SMF may allocate the resources for the PDU session in the EPC network. For example, the PGW-C+SMF may send a request to allocate resources for the PDU session in the EPS network to the AMF. In an embodiment, the PGW-C+SMF may send a request to allocate an identity of a bearer in the EPS network for the PDU session to the AMF, when the indication indicates the N26 interface is to be used for the interworking of the PDU session. In another embodiment, the PGW-C+SMF may store information of the PDU session in a third node (e.g., in a Unified Data Management, UDM) without sending a request to allocate an identity of a bearer in the EPS network for the PDU session to the AMF, when the indication indicates the N26 interface is not to be used for the interworking of the PDU session. In an embodiment, when the N26 interface is not to be used for the interworking of the PDU session, if the AMF receives a request to allocate an identity of a bearer in the EPS network for the PDU session from the PGW-C+SMF, the AMF should send a response to reject the request to the PGW-C+SMF.

The indication can be determined by the AMF in various ways, e.g., the AMF determines the indication by itself or by obtaining information from another node. In an embodiment, whether the PDU session supports interworking with the EPS network or not is determined based on the UE's capability and/or a subscription data of the UE, which may indicate a restriction to connect to the EPS network. In an embodiment, whether the PDU session supports interworking with the EPS network or not may further be determined based on network configuration. In an embodiment, the UE's capability may include the network capability information of the UE, e.g., the MM Core Network Capability information of the UE. In an embodiment, the subscription data of the UE may include, e.g., the Core Network type restriction parameter of a UE. For example, if the UE's MM Core Network Capability IE indicates "S1 mode supported" and the value of the Core Network type restriction parameter of the UE is not "EPC" (or the Core Network type restriction parameter does not exist at all), it can be determined that the PDU session supports interworking with the EPS network; otherwise, the PDU session does not support interworking with the EPS network.

Figure 5:
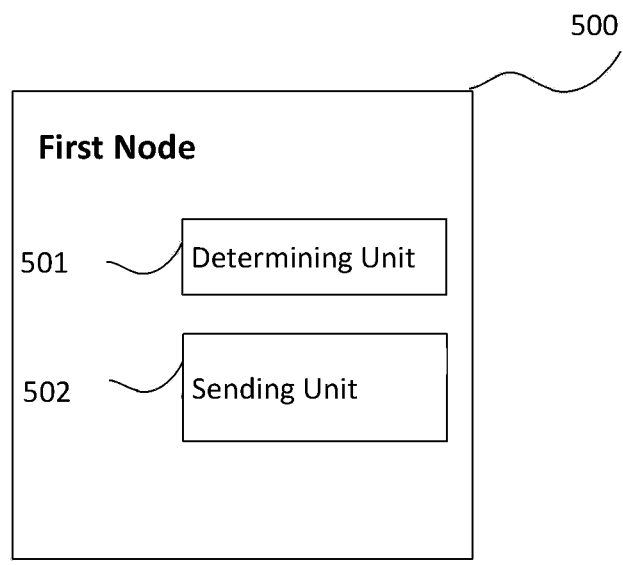
FIG. 5 is a schematic block diagram of a first node according to the present disclosure.

FIG. 5 illustrates a schematic block diagram of a first node 500 according to the present disclosure. The first node 500 (e.g., an AMF) may facilitate a PDU session procedure for a UE in a first communication network (e.g., a 5GS network), wherein the first communication network is interworking with a second communication network (e.g., an EPS network), and a second node (e.g., a PGW-C+SMF) supporting the interworking is selected for managing the PDU session. The first node 500 may include a determining unit 501, for determining the PDU session supports interworking with the second network; and a sending unit 502, for sending the indication to the second node.

Figure 6:
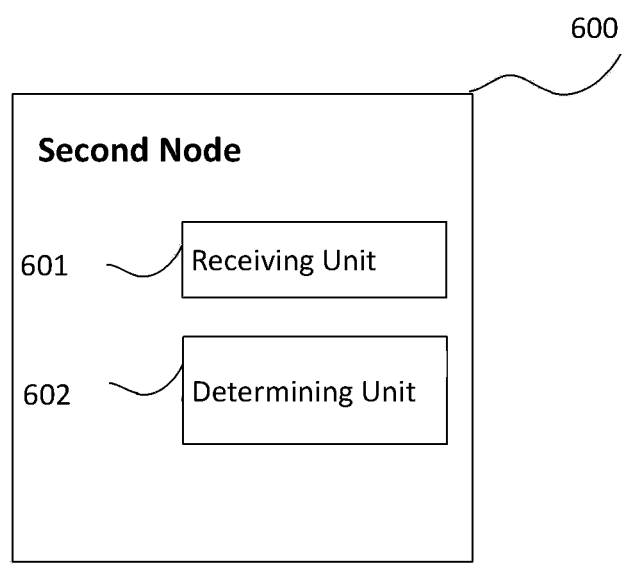
FIG. 6 is a schematic block diagram of a second node according to the present disclosure.

FIG. 6 illustrates a schematic block diagram of a second node 600 according to the present disclosure. The second node 600 (e.g., a PGW-C+SMF) may facilitate a PDU session procedure for a UE in a first communication network (e.g., a 5GS network), wherein the first communication network is interworking with a second communication network (e.g., an EPS network), and the second node is supporting the interworking and is selected for managing the PDU session. The second node 600 may include a receiving unit 601, for receiving an indication indicating whether the PDU session supports interworking with second network from a first node; and a determining unit 602, for determining whether the PDU session supports interworking with the second network according to the indication.

It can be appreciated that, the first node 500 and the second node 600 described herein may be implemented by various units, so that each of the first node 500 and the second node 600 implementing one or more functions described with the embodiments may comprise not only the unit(s) shown in the corresponding figure, but also other units for implementing one or more functions thereof. In addition, each of the first node 500 and the second node 600 may comprise a single unit configured to perform two or more functions, or separate units for each separate function. Moreover, the units may be implemented in hardware, firmware, software, or any combination thereof.

It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Furthermore, the solution of the present disclosure may take the form of a computer program on a memory having computer-usable or computer-readable program code embodied in the medium for use by or in connection with an instruction execution system. In the context of this document, a memory may be any medium that may contain, store, or is adapted to communicate the program for use by or in connection with the instruction execution system, apparatus, or device.

Figure 7:
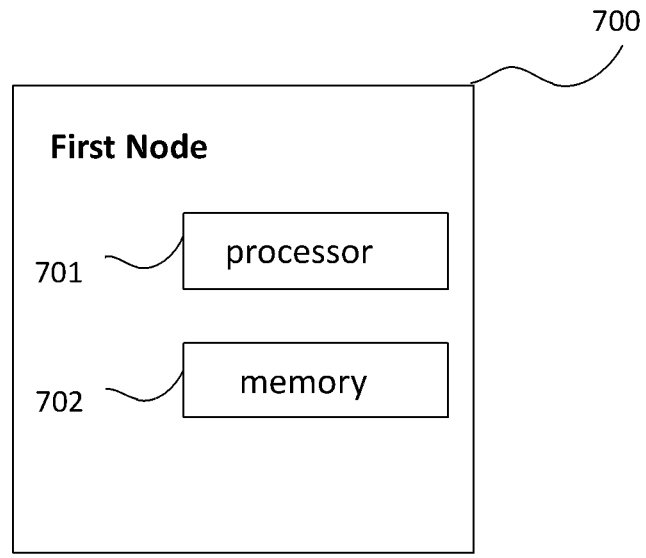
FIG. 7 is another schematic block diagram of a first node according to the present disclosure.
Figure 8:
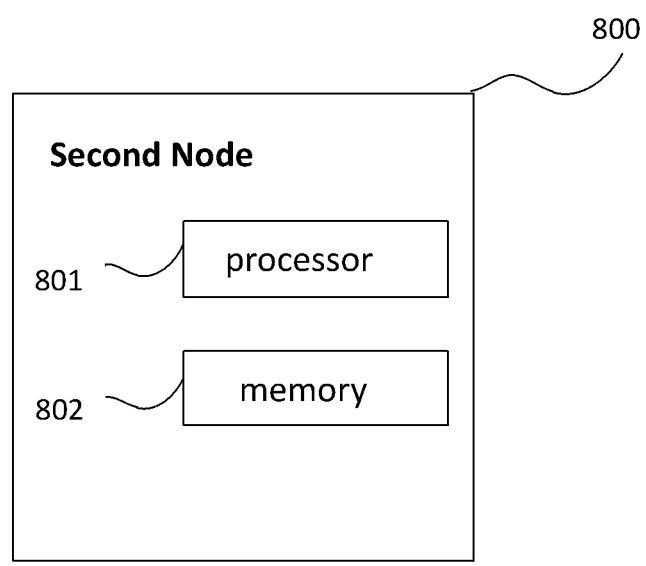
FIG. 8 is another schematic block diagram of a second node according to the present disclosure.

Therefore, the present disclosure also provides a first node 700 including a processor 701 and a memory 702, as shown in FIG. 7. In the first node 700, the memory 702 stores instructions that when executed by the processor 701 cause the first node 700 to perform the method at the first node described above with the embodiments. The present disclosure also provides a second node 800 including a processor 801 and a memory 802, as shown in FIG. 8. In the second node 800, the memory 802 stores instructions that when executed by the processor 801 cause the second node 800 to perform the method at the second node described above with the embodiments.

The present disclosure also provides a machine readable medium (not illustrated) having stored thereon instructions that when executed on a first node cause the first node to perform the method at the first node described with the above embodiments. The present disclosure also provides a machine readable medium (not illustrated) having stored thereon instructions that when executed on a second node cause the second node to perform the method at the second node described with the above embodiments.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a first node for facilitating a Protocol Data Unit (PDU) session procedure for a User Equipment (UE) in a first communication network, wherein the first communication network is interworking with a second communication network, and a second node supporting the interworking is selected for managing the PDU session, the method comprising:
   determining an indication which indicates whether the PDU session supports interworking with the second communication network; and
   sending the indication to the second node;
   wherein the first communication network is a 5th Generation System (5GS) network, the second communication network is an Evolved Packet System (EPS) network, the first node is an Access and mobility Management Function (AMF), and the second node is a Packet Data Network Gateway Control plane Function+Session Management Function (PGW-C+SMF);
   wherein the determining is based on a capability of the UE, a subscription data of the UE, or both the capability of the UE and the subscription data of the UE; and
   wherein a value of the capability of the UE comprises S1 mode supported or the subscription data of the UE comprises core network type restriction to the second communication network, or both.

2. The method of claim 1, wherein whether the PDU session supports interworking with the second communication network comprises whether the PDU session can be moved to the second communication network.

3. The method of claim 1, wherein the determining is based on network configuration.

4. The method of claim 1, wherein the capability of the UE comprises Core Network Capability information of the UE, and the subscription data of the UE comprises core network type restriction to the second communication network.

5. The method of claim 1, wherein a value of the capability of the UE comprises S1 mode supported or N1 mode supported.

6. The method of claim 1, wherein a value of the subscription data of the UE comprises EPC or 5GC, or the value does not exist.

7. The method of claim 1, wherein the PDU session procedure is a PDU session establishment.

8. The method of claim 1, further comprising:
receiving a request to allocate resources for the PDU session in the second communication network from the second node.

9. The method of claim 8, further comprising:
sending a response to reject the request to allocate resources for the PDU session in the second communication network to the second node, when the indication indicates the PDU session not supporting interworking with the second communication network.

10. The method of claim 8, wherein the resources comprise EPS bearer identity.

11. The method of claim 8, wherein when the PDU session supports interworking with the second communication network, the indication further indicates whether a N26 interface between the 5GS network and the EPS network is to be used for the interworking of the PDU session.

12. The method of claim 11, further comprising sending a response to reject a request to allocate an identity of a bearer in the EPS network for the PDU session from the PGW-C+SMF, when the N26 interface is not to be used for the interworking of the PDU session.

13. A first node for facilitating a PDU session procedure for a UE in a first communication network, wherein the first communication network is interworking with a second communication network, and a second node supporting the interworking is selected for managing the PDU session, the first node comprising:
a processor; and
a memory, having stored instructions that, when executed by the processor, cause the first node to:
determine an indication which indicates whether the PDU session supports interworking with the second communication network; and
send the indication to the second node;
wherein the first communication network is a 5th Generation System (5GS) network, the second communication network is an Evolved Packet System (EPS) network, the first node is an Access and mobility Management Function (AMF), and the second node is a Packet Data Network Gateway Control plane Function+Session Management Function (PGW-C+SMF);
wherein the determining is based on a capability of the UE, a subscription data of the UE, or both the capability of the UE and the subscription data of the UE; and
wherein a value of the capability of the UE comprises S1 mode supported or the subscription data of the UE comprises core network type restriction to the second communication network, or both.

14. A method at a second node for facilitating a PDU session procedure for a UE in a first communication network, wherein the first communication network is interworking with a second communication network, and the second node is supporting the interworking and is selected for managing the PDU session, the method comprising:
receiving an indication indicating whether the PDU session supports interworking with second communication network from a first node; and
determining whether the PDU session supports interworking with the second communication network according to the indication;
wherein the first communication network is a 5th Generation System (5GS) network, the second communication network is an Evolved Packet System (EPS) network, the first node is an Access and mobility Management Function (AMF), and the second node is a Packet Data Network Gateway Control plane Function+Session Management Function (PGW-C+SMF);
wherein the indication is determined at the first node based on a capability of the UE, a subscription data of the UE, or both the capability of the UE and the subscription data of the UE; and
wherein a value of a capability of the UE comprises S1 mode supported or the subscription data of the UE comprises core network type restriction to the second communication network, or both.

15. The method of claim 14, wherein whether the PDU session supports interworking with the second communication network comprises whether the PDU session can be moved to the second communication network.

16. The method of claim 14, wherein the PDU session procedure is a PDU session establishment.

17. The method of claim 14, further comprising:
sending a request to allocate resources for the PDU session in the second communication network to the first node.

18. The method of claim 17, further comprising:
receiving a response to reject the request to allocate resources for the PDU session in the second communication network from the first node, when the indication indicates the PDU session not supporting interworking with the second communication network.

19. The method of claim 17, further comprising:
skipping preparation for allocating resources for the PDU session in the second communication network, when determining that the PDU session does not support interworking with the second communication network.

20. The method of claim 17, wherein the resources comprise EPS bearer identity.

21. The method of claim 17, further comprising:
sending a request to allocate an identity of a bearer in the EPS network for the PDU session to the AMF, when the indication indicates a N26 interface between the 5GS network and the EPS network is to be used for the interworking of the PDU session.

22. The method of claim 17, further comprising:
storing information of the PDU session in a third node, when the indication indicates a N26 interface between the 5GS network and the EPS network is not to be used for the interworking of the PDU session.

23. A second node for facilitating a PDU session procedure for a UE in a first communication network, wherein the first communication network is interworking with a second communication network, and the second node is supporting the interworking and is selected for managing the PDU session, the second node comprising:
a processor; and
a memory, having stored instructions that, when executed by the processor, cause the second node to:
receive an indication indicating whether the PDU session supports interworking with the second communication network from a first node; and
determine whether the PDU session supports interworking with the second communication network according to the indication;

wherein the first communication network is a 5th Generation System (5GS) network, the second communication network is an Evolved Packet System (EPS) network, the first node is an Access and mobility Management Function (AMF), and the second node is a Packet Data Network Gateway Control plane Function+Session Management Function (PGW-C+SMF);

wherein the indication is determined at the first node based on a capability of the UE, a subscription data of the UE, or both the capability of the UE and the subscription data of the UE; and wherein a value of the capability of the UE comprises S1 mode supported or the subscription data of the UE comprises core network type restriction to the second communication network, or both.

* * * * *

UNITED STATES PATENT AND TRADEMARK OFFICE
CERTIFICATE OF CORRECTION

PATENT NO. : 10,965,793 B2
APPLICATION NO. : 16/643507
DATED : March 30, 2021
INVENTOR(S) : Gan et al.

Page 1 of 1

It is certified that error appears in the above-identified patent and that said Letters Patent is hereby corrected as shown below:

In the Specification

In Column 5, Line 6, delete "EPC/E-UTRAN;" and insert -- EPC/E-UTRAN. --, therefor.

In Column 5, Line 7, delete "illustrates flowchart" and insert -- illustrates a flowchart --, therefor.

In Column 5, Line 8, delete "disclosure;" and insert -- disclosure. --, therefor.

In Column 5, Line 9, delete "illustrates flowchart" and insert -- illustrates a flowchart --, therefor.

In Column 5, Line 10, delete "dis closure;" and insert -- disclosure. --, therefor.

In Column 5, Line 36, delete ""comprises" "comprising,"" and insert -- "comprises," "comprising," --, therefor.

In the Claims

In Column 12, Line 15, in Claim 14, delete "value of a capability" and insert -- value of the capability --, therefor.

Signed and Sealed this
Seventh Day of September, 2021

Drew Hirshfeld
*Performing the Functions and Duties of the
Under Secretary of Commerce for Intellectual Property and
Director of the United States Patent and Trademark Office*